(12) United States Patent
Hynes

(10) Patent No.: US 6,674,400 B1
(45) Date of Patent: Jan. 6, 2004

(54) APPARATUS FOR PROVIDING GPS POSITIONING INFORMATION TO A PLURALITY OF COMPUTERS FROM ONLY ONE GPS RECEIVER

(75) Inventor: Mark W. Hynes, Sierra Vista, AZ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/384,242

(22) Filed: Mar. 10, 2003

(51) Int. Cl.[7] .............................. G01S 5/02; H04B 7/185
(52) U.S. Cl. ................................... 342/357.06; 701/213
(58) Field of Search ....................... 342/357.06; 701/213

(56) References Cited

U.S. PATENT DOCUMENTS 5,519,403 A 5/1996 Bickley et al.
5,936,553 A 8/1999 Kabel
6,370,159 B1 * 4/2002 Eidson ....................... 370/503

* cited by examiner

Primary Examiner—Theodore M. Blum
(74) Attorney, Agent, or Firm—Alan P. Klein

(57) ABSTRACT

An apparatus for providing GPS positioning information to a master computer and a plurality of slave computers from only one GPS receiver. The apparatus includes a circuit adapted to be coupled between the GPS receiver and the computers for providing each computer with a replica of a positioning information signal from the GPS receiver so that each computer receives all of the positioning information it would have received if it had been connected to its own GPS receiver. In addition, the apparatus includes a circuit adapted to be coupled between the GPS receiver and the computers for providing each computer with a replica of a synchronizing signal from the GPS receiver so that each computer receives the synchronizing signal it would have received if it had been connected to its own GPS receiver. Further, the apparatus includes a circuit adapted to be coupled between the GPS receiver and the master computer for passing a control signal from the master computer to the GPS receiver to set up and control the state of the GPS receiver.

20 Claims, 2 Drawing Sheets

US 6,674,400 B1

APPARATUS FOR PROVIDING GPS POSITIONING INFORMATION TO A PLURALITY OF COMPUTERS FROM ONLY ONE GPS RECEIVER

BACKGROUND OF THE INVENTION

This invention relates in general to electrical communications and more particularly to position indication.

When instrumentation computers are used during field test exercises it is customary to use Global Positioning System (GPS) receivers to provide accurate positioning information and synchronizing signals to the computers. Since a GPS receiver can provide an interface with only a single computer, each computer must be provided with its own GPS receiver. This is not practical when a large number of collocated computers are used.

SUMMARY OF THE INVENTION

It is therefore an object of this invention to operate several collocated instrumentation computers off a single GPS receiver.

This and other objects of the invention are achieved by an apparatus for providing GPS positioning information to a master computer and a plurality of slave computers from only one GPS receiver. The apparatus includes positioning information providing means adapted to be coupled between the GPS receiver and the computers for providing each computer with a replica of a positioning information signal from the GPS receiver so that each computer receives all of the positioning information it would have received if it had been connected to its own GPS receiver. In addition, the apparatus includes synchronizing means adapted to be coupled between the GPS receiver and the computers for providing each computer with a replica of a synchronizing signal from the GPS receiver so that each computer receives the synchronizing signal it would have received if it had been connected to its own GPS receiver. Further, the apparatus includes means adapted to be coupled between the GPS receiver and the master computer for passing a control signal from the master computer to the GPS receiver to set up and control the state of the GPS receiver.

The apparatus provides GPS positioning information to a plurality of computers through the novel use of a master-slave relationship among the computers. The master computer communicates with the GPS receiver as if the slave computers were not present and sets up and controls the state of the GPS receiver. The slave computers have no control over the GPS receiver and operate in a listen-only mode. The positioning information signal and the synchronizing signal are coupled off, converted to the proper levels, buffered, reconverted, and sent to each of the slave computers. The apparatus provides indicators showing the status of the positioning information signal and the synchronizing signal. This increases user confidence in the status of the apparatus, while enabling quick diagnosis of any problems that may arise.

The apparatus provides significant cost savings by reducing the number of GPS receivers and associated hardware and cabling required in the deployment of test instrumentation during developmental and operational field test exercises. It also saves on manpower because a single GPS is installed rather than multiple units. It increases reliability while reducing the consumption of power by reducing the number of active elements.

Additional advantages and features will become more apparent as the subject invention becomes better understood by reference to the following detailed description when considered in conjunction with the accompanying drawings wherein.

DETAILED DESCRIPTION

Figure 1:
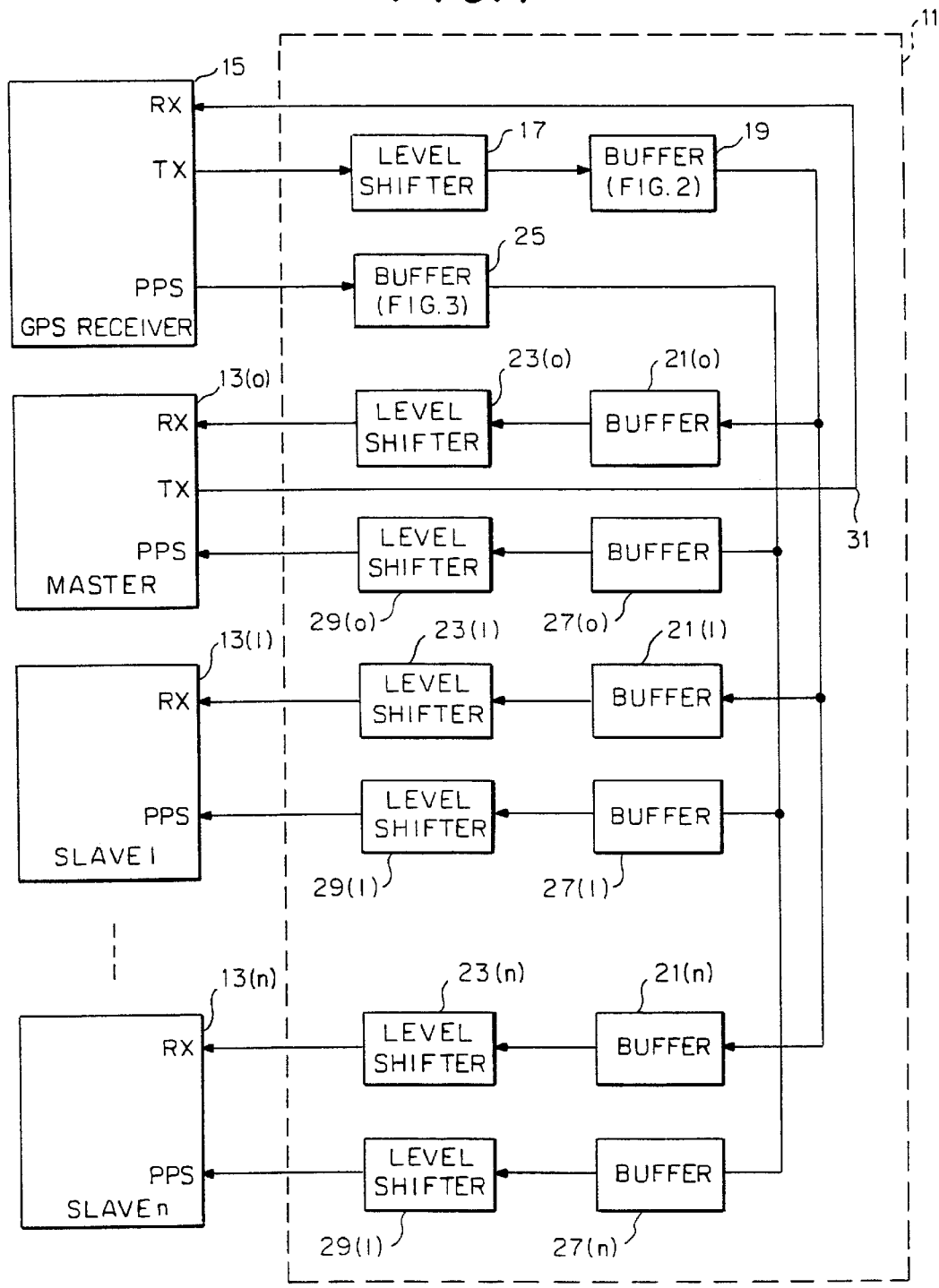
FIG. 1 is a block diagram of an apparatus for providing GPS positioning information to a master computer and a plurality of slave computers from only one GPS receiver in accordance with the invention.

FIG. 1 shows an embodiment of the apparatus 11 for providing GPS positioning information to a master computer 13(0) and a plurality of slave computers 13(1) ... 13(n) from only one GPS receiver 15. The GPS receiver may be, for example, a Garmin Ltd. Model 35 receiver which communicates using an RS-232 interface and a TTL compatible synchronizing signal. The computers may be, for example, MFDC instrumentation computers.

The apparatus 11 includes a positioning information providing means which provides each computer with a replica of the positioning information signal from the GPS receiver so that each computer receives all of the positioning information it would have received if it had been connected to its own GPS receiver; a synchronizing means which provides each computer with a replica of the synchronizing signal from the GPS receiver so that each computer receives the synchronizing signal it would have received if it had been connected to its own GPS receiver; and means which passes a control signal from the master computer to the GPS receiver to set up and control the state of the GPS receiver.

The positioning information providing means and the synchronizing means are each adapted to be coupled between the GPS receiver 15 and the master and slave computers 13(0), 13(1), ... 13(n), while the control signal passing means is adapted to be coupled between the GPS receiver 15 and the master computer 13(0).

While the position information providing means may take a variety of forms, conveniently it may take the form shown of a level shifter 17 adapted to be coupled to the GPS receiver 15, a buffer 19 connected to the level shifter 17, a plurality of buffers 21(0), 21(1), ... 21(n), each connected in series with the buffer 19, and a plurality of level shifters, 23(0), 23(1), ... 23(n), each connected to a respective buffer 21(0), 21(1), ... 21(n), and adapted to be coupled to a respective one of the computers 13(0), 13(1) ... 13(n).

While the synchronizing means may take a variety of forms, conveniently it may take the form of a buffer 25 adapted to be coupled to the GPS receiver 15, a plurality of buffers 27(0), 27(1), ... 27(n), each connected in series with the buffer 25, and a plurality of level shifters, 29(0), 29(1), ... 29(n), each connected to a respective buffer 27(0), 27(1), ... 27(n), and adapted to be coupled to a respective one of the computers 13(0), 13(1), ... 13(n).

While the control signal passing means may take a variety of forms, conveniently it may take the form of a signal lead 31.

Figure 2:
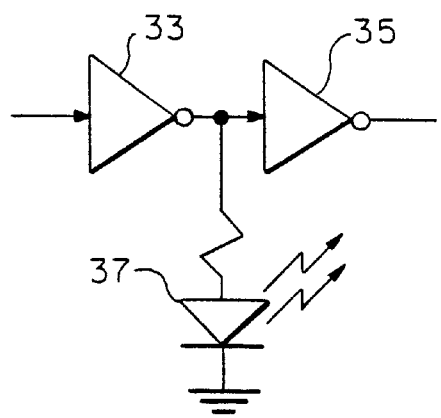
FIG. 2 is a circuit diagram of the buffer shown in FIG. 1.

The details of the buffer 19 are shown in FIG. 2. The buffer 19 includes an inverter 33, an inverter 35 connected in series with the inverter 33, and an LED indicator 37 connected between the junction of the inverters 33 and 35 and ground.

Figure 3:
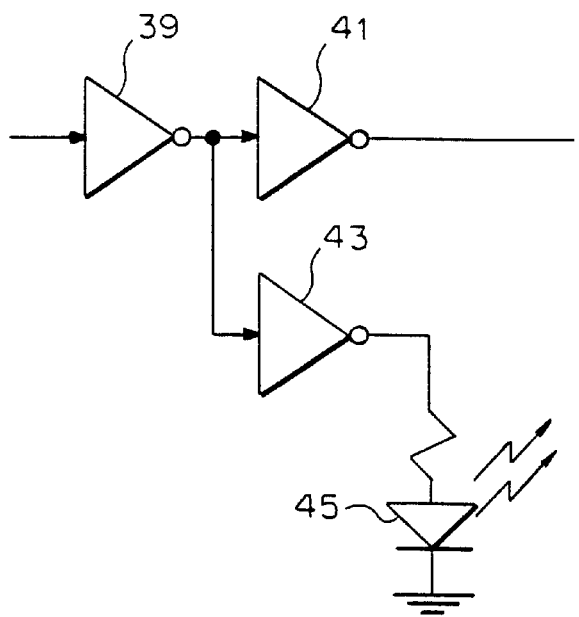
FIG. 3 is a circuit diagram of the buffer shown in FIG. 1.

The details of the buffer 25 are shown in FIG. 3. The buffer 25 includes an inverter 39, an inverter 41 connected in series with the inverter 39, an inverter 43 connected to the junction of the inverters, and an LED indicator 45 connected between the inverter 43 and ground.

The following exemplary TTL logic components may be employed in the apparatus 11:

Level shifters 17, 23(0), 23(1) . . . 23(n), 29(0), 29(1), . . . 29(n): Maxim IC part number MAX 211E.

Buffers 21(0), 21(1), . . . 21(n), 27(0), 27(1), . . . 27(n): Texas Instruments part number 74F244.

Inverters 33, 35, 37, 39, 41, 43: Texas Instrument part number 74F04.

Light-emitting diodes 37, 45: Chicago Miniature part number 5380H5-5.

In operation, a control signal (TX) is passed by the apparatus 11 from the master computer 13(0) to the GPS receiver 15 on the signal lead 31 to set up and control the state of the GPS receiver 15.

The GPS receiver 15 transmits its synchronizing signal (PPS) to the apparatus 11, where it is received by the buffer 25 which provides isolation. In the buffer 25 (FIG. 3), the inverter 39 reverses the logic levels, and the inverter 41 restores the logic levels. The inverter 43 also restores the logic levels and the LED indicator 45 emits visible light when current passes through it, indicating to the user that the apparatus is receiving a good signal. For a pulse-per-second synchronizing signal, the LED illuminates at the beginning of each second when the signal transitions from the false state to the true state. The synchronizing signal is passed to a plurality of buffers 27(0), 27(1), . . . 27(n), which provide further isolation. Each of the buffers 27(0), 27(1), . . . 27(n), passes a replica of the synchronizing signal to a respective one of a plurality of level shifters 29(0), 29(1), . . . 29(n), which converts between TTL signal levels and RS-232 signaling. Then, each level shifter 29(0), 29(1), . . . 29(n), passes the replica of the synchronizing signal from the apparatus 11 to a respective master or slave computer 13(0), 13(1), . . . 13(n).

Also, the GPS receiver 15 transmits its positioning information signal (TX) to the apparatus 11 where it is received by the level shifter 17. The level shifter 17 converts between RS-232 standard signaling and TTL signal levels and passes the positioning information signal to the buffer 19 which provides isolation. In the buffer 19 ( FIG. 2), the inverter 33 reverses the logic levels, and the inverter 35 restores the logic levels. The LED indicator 37 emits visible light when current passes through it, indicating to the user that the apparatus is receiving a good signal. The inverted state is used so that the quiescent state will be indicated by the LED being off and signal transmission will be indicated by the LED being illuminated. The positioning information signal is passed to the plurality of buffers 21(0), 21(1), . . . 21(n), which provide further isolation. Each of the buffers 21(0), 21(1), . . . 21(n), passes a replica of the positioning information signal to a respective one of the plurality of level shifters 23(0), 23(1), . . . 23(n), which converts between TTL signal levels and RS-232 standard signaling. Then each level shifter 23(0), 23(1), . . . 23(n), passes the replica of the positioning information signal from the apparatus 11 to a respective master or slave computer 13(0), 13(1), . . . 13(n).

Therefore, it is apparent that the disclosed apparatus is an efficient device for providing GPS positioning information to a plurality of computers from only one GPS receiver and for eliminating the need to provide each computer with its own GPS receiver.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. An apparatus for providing GPS positioning information to a master computer and a plurality of slave computers from only one GPS receiver comprising:

positioning information providing means adapted to be coupled between the GPS receiver and the computers for providing each computer with a replica of a positioning information signal from the GPS receiver so that each computer receives all of the positioning information it would have received if it had been connected to its own GPS receiver;

synchronizing means adapted to be coupled between the GPS receiver and the computers for providing each computer with a replica of a synchronizing signal from the GPS receiver so that each computer receives the synchronizing signal it would have received if it had been connected to its own GPS receiver; and means adapted to be coupled between the GPS receiver and the master computer for passing a control signal from the master computer to the GPS receiver to set up and control the state of the GPS receiver.

2. The apparatus recited in claim 1 wherein the positioning information providing means includes a first level shifter adapted to be coupled to the GPS receiver for receiving the positioning information signal and converting logic levels.

3. The apparatus recited in claim 2 wherein the positioning information providing means includes a first buffer connected to the first level shifter for providing isolation and passing the positioning information signal.

4. The apparatus recited in claim 3 wherein the first buffer includes a first inverter for reversing the logic levels of the positioning information signal.

5. The apparatus recited in claim 4 wherein the first buffer includes a second inverter connected in series with the first inverter for restoring the logic levels of the positioning information signal.

6. The apparatus recited in claim 5 wherein the first buffer includes an LED indicator connected to the junction of the first and the second inverter to emit visible light when current passes through the indicator.

7. The apparatus recited in claim 3 wherein the positioning information providing means includes a plurality of second buffers to provide isolation, each second buffer connected in series with the first buffer and passing a replica of the positioning information signal.

8. The apparatus recited in claim 7 wherein the positioning information providing means includes a plurality of second level shifters, each second level shifter being connected to a respective second buffer and adapted to be coupled to a respective one of the computers for converting logic levels and passing a replica of the positioning information signal to the computer.

9. The apparatus recited in claim 1 wherein the synchronizing means includes a first buffer adapted to be coupled to the GPS receiver for receiving the synchronizing signal and providing isolation.

10. The apparatus recited in claim 9 wherein the synchronizing means includes a plurality of second buffers to provide isolation, each second buffer being connected in series with the first buffer.

11. The apparatus recited in claim 10 wherein the synchronizing means includes a plurality of level shifters, each level shifter being connected to a respective second buffer and adapted to be coupled to a respective one of the computers for passing a replica of the synchronizing signal to the computer.

12. The apparatus recited in claim 9 wherein the first buffer includes a first inverter for reversing the logic levels of the synchronizing signal.

13. The apparatus recited in claim 12 wherein the first buffer includes a second inverter connected in series with the first inverter for restoring the logic levels of the synchronizing signals.

14. The apparatus recited in claim 13 wherein the first buffer includes a third inverter connected to the junction of the first and second inverter for restoring the logic levels of the synchronizing signals.

15. The apparatus recited in claim 14 wherein the first buffer includes an LED indicator connected to the third inverter to emit visible light when current passes through the indicator.

16. The apparatus recited in claim 1 wherein the means for passing a control signal includes a signal lead.

17. The apparatus recited in claim 1 in combination with a GPS receiver, a master computer and a plurality of slave computers.

18. An apparatus for providing GPS positioning information to a master computer and a plurality of slave computers from only one GPS receiver comprising:
- a first level shifter adapted to be coupled to the GPS receiver for receiving a positioning information signal and converting logic levels;
- a first buffer connected to the first level shifter for providing isolation and passing the positioning information signal;
- a plurality of second buffers to provide isolation, each second buffer connected in series with the first buffer and passing a replica of the positioning information signal;
- a plurality of second level shifters, each second level shifter being connected to a respective second buffer and adapted to be coupled to a respective one of the computers for converting logic levels and passing a replica of the positioning information signal to the computer;
- a third buffer adapted to be coupled to the GPS receiver for receiving a synchronizing signal and providing isolation;
- a plurality of fourth buffers to provide isolation, each fourth buffer being connected in series with the third buffer;
- a plurality of third level shifters, each third level shifter being connected to a respective fourth buffer and adapted to be coupled to a respective one of the computers for passing a replica of the synchronizing signal to the computer; and
- a signal lead adapted to be coupled between the GPS receiver and the master computer for passing a control signal from the master computer to the GPS receiver to set up and control the state of the GPS receiver.

19. The apparatus recited in claim 18 in combination with a GPS receiver, a master computer and a plurality of slave computers.

20. A method of providing GPS positioning information to a master computer and a plurality of slave computers from only one GPS receiver comprising the steps of:
- providing each computer with a replica of the positioning information signal from the GPS receiver so that each computer receives all of the positioning information it would have received if it had been connected to its own GPS receiver;
- providing each computer with a replica of the synchronizing signal from the GPS receiver so the each computer receives the synchronizing signal it would have received if it had been connected to its own GPS receiver; and
- passing a control signal from the master computer to the GPS receiver to set up and control the state of the GPS receiver.

* * * * *